United States Patent [19]
Hirasawa et al.

[11] Patent Number: 5,461,262
[45] Date of Patent: Oct. 24, 1995

[54] VEHICLE MOUNTED ADAPTOR FOR A PORTABLE RADIO TRANSCEIVER

[75] Inventors: Naoki Hirasawa, Tokyo; Mitsuru Tanaka, Saitama, both of Japan

[73] Assignee: NEC Corporation, Tokyo, Japan

[21] Appl. No.: 10,195

[22] Filed: Jan. 28, 1993

[30] Foreign Application Priority Data

Jan. 29, 1992 [JP] Japan .................... 4-038827

[51] Int. Cl.$^6$ ...................................... H02J 7/00
[52] U.S. Cl. ............................ 307/10.1; 320/21
[58] Field of Search .............. 307/64, 66, 10.1, 307/64–66; 455/343, 67.7, 226.2, 345, 346, 226.2, 161.5, 157.1, 140, 67.1; 320/9, 21, 39, 31, 14, 17

[56] References Cited

U.S. PATENT DOCUMENTS

| 4,965,462 | 10/1990 | Crawford | 307/66 |
| 5,157,271 | 10/1992 | Fujiwara | 307/66 |

*Primary Examiner*—Peter S. Wong
*Assistant Examiner*—Aditya Krishnan
*Attorney, Agent, or Firm*—Sughrue, Mion, Zinn, Macpeak & Seas

[57] ABSTRACT

A vehicle mounted adaptor is arranged to be coupled to a portable transceiver when the portable transceiver is used within the passenger compartment of the vehicle. The portable transceiver includes a main battery, a backup battery and a power switch circuit. The power switch circuit is supplied with power from either one of said main and backup batteries and generates a control signal when turned on for operating the portable transceiver. The adaptor includes a power switch which is coupled to a car battery mounted on the vehicle. The power switch of the adaptor is switched over from OFF position to ON position when the control signal is generated and switched over from the ON position to the OFF position when the control signal is terminated. The adaptor further includes a backup battery charger which is coupled to the power switch. The backup battery charger serves to charge the backup battery when said first means is in the OFF position. Therefore, the backup battery charger is able to charge the backup memory even if the portable transceiver fails to generate the control signal due to a poor condition of both the main and backup batteries.

8 Claims, 2 Drawing Sheets

VEHICLE MOUNTED ADAPTOR FOR A PORTABLE RADIO TRANSCEIVER

BACKGROUND OF THE INVENTION

1. Field of the Invention

The present invention relates to a vehicle mounted adaptor to which a portable radio transceiver, such as a hand-held mobile telephone or the like, is attached when used within a passenger compartment of a vehicle, and more specifically to such an adaptor which features an arrangement for recharging a backup battery provided in the transceiver.

2. Description of the Prior Art

In order to realize wider usage of a portable radio transceiver, it is a current tendency to design the transceiver in a manner to be attachable to a vehicle mounted adaptor when used in a passenger compartment of a vehicle. Thus, a portable transceiver subscriber is able to utilize his or her transceiver using power obtained from a car battery instead of a battery which has been installed in the transceiver. This is very advantageous from the battery power saving point of view in that the battery in the transceiver is of relatively limited power capacity. Further, the battery provided in the transceiver can be recharged while the transceiver is attached to the adaptor.

Before turning to the present invention it is deemed advantageous to discuss, with reference to FIG. 1, a known adaptor of the nature mentioned above.

FIG. 1 is a block diagram schematically showing a vehicular adaptor 10 and a portable radio transceiver 11. This transceiver 11 is operatively attached to the adaptor 10 when used within a passenger compartment of a vehicle. As shown, the adaptor 10 includes a power switch 12, a voltage regulator 14, a battery charger 16, and a hands free (viz., speakerphone) circuit 18. A car battery 20 has a minus terminal grounded and a plus terminal coupled to a common terminal 12a of the power switch 12 via a terminal 22a. The hands free circuit 18 is coupled to a loudspeaker 24 and a microphone 26 by way of terminals 28a, 28b, respectively. A terminal 22b of the adaptor 10 is grounded.

The power switch 12 is switched over from OFF position to ON position when a control signal C1 is applied thereto from the transceiver 11. The control signal C1 will be mentioned later. The voltage regulator 14 serves to lower a car battery voltage (12 volts for example) to a potential suitable for use in the transceiver 11. The voltage appearing at the output of the regulator 14 is maintained constant as is well known in the art. Each of the battery charger 16 and the hands free circuit 18, is configured in a manner well known to those skilled in the art and thus further descriptions thereof will be omitted for the sake of brevity.

The vehicular adaptor 10 is further provided with interface terminals 30a, 32a, 34a, 36a, 38a and 40a which are respectively coupled to counterparts 30b, 32b, 34b, 36b, 38b and 40b of the portable radio transceiver 11.

The transceiver 11 is further comprised of a power circuit 50, a main battery 52, a backup battery 54, a diode 56, a central processing unit (CPU) 58, a power switch circuit 60, a transmitter/receiver (TX/RX) section 62, and an antenna 64, all of which are coupled as illustrated.

The diode 56 is for preventing a direct current in the direction from the backup battery 54 to the main battery 52. The power switch circuit 60 includes a manually operated power switch 60a by which the operations of the transceiver 11 is initiated or terminated.

The ground or earth potential lines within the blocks 10, 11 are omitted merely for the sake of simplifying the drawing.

A portable mode of the transceiver 11 (viz., the transceiver 11 is used outside of a vehicle), will be described in brief. When the power switch 60a is turned on, it generates the above mentioned control signal C1 and another control signal C2. The CPU 58 responds to the control signal C2 and applies a control signal C3 to the power circuit 50 which, in response thereto, supplies the CPU 58 and the transmitter/receiver 62 with DC (direct current) power from the main battery 52. Thus, the portable transceiver 11 enters into an operation mode.

On the other hand, when the power switch 60a remains open in the portable mode, the main battery 52 continues to supply the CPU 58 and the power switch circuit 60 with DC power. Further, the main battery 52 serves to charge the backup battery 54. The power switch circuit 60 is ready to generate the control signals C1, C2. In the event that the main battery 52 is rendered inoperative due to over-discharging, the backup battery 54 initiates the DC power supply to the power switch circuit 60 and the CPU 58 in place of the main battery 52. This operation is not clear from FIG. 1, but, the instant invention is not directly concerned therewith and hence the detailed arrangements thereof are omitted for the sake of brevity.

On the contrary, in the event that the portable radio transceiver 11 is used within a vehicle compartment of a vehicle (viz., in-car mode), the transceiver 11 is coupled to the adaptor 10 as schematically illustrated in FIG. 1. The power switch 12 is switched over from OFF position to ON position in response to the control signal C1 which is generated upon the power switch 60a being turned on. Thus, the power circuit 50 receives DC power from the voltage regulator 14 and energizes the CPU 58 and the transmitter/receiver section 62. The transceiver 11 is usually designed such that the main battery 52 is prevented from supplying the power circuit 50 with DC power while the power circuit 50 is coupled to the voltage regulator 14. However, the present invention is not limited to such a transceiver design.

It is assumed that the main and backup batteries 52, 54 are both rendered inoperative due to over-discharging at the time when transceiver 11 is attached to the adaptor 10. In such a case, the power switch circuit 60 fails to issue the control signal C1 when the power switch 60a is turned on. This means that the power switch 12 is no longer switched over to the ON position even if the power switch 60a is turned on. As a result, the above mentioned prior art has encountered the problem in that the main battery 52 is undesirably required to be recharged using another suitable battery charger (not shown) in place of the vehicle mounted adaptor 10.

SUMMARY OF THE INVENTION

It is an object of the present invention to provide a vehicle mounted adaptor which includes a battery charger which is able to constantly recharge a backup memory in a portable radio transceiver when the transceiver is coupled to the adaptor.

In general terms, the present invention provides a vehicle mounted adaptor is arranged to be coupled to a portable transceiver when the portable transceiver is used within the passenger compartment of the vehicle. The portable transceiver includes a main battery, a backup battery and a power switch circuit. The power switch circuit is supplied with power from either one of the main and backup batteries and generates a control signal when turned on for operating the portable transceiver. The adaptor includes a power switch which is coupled to a car battery mounted on the vehicle. The power switch of the adaptor is switched over from OFF position to ON position when the control signal is generated and switched over from the ON position to the OFF position when the control signal is terminated. The adaptor further includes a backup battery charger which is coupled to the power switch. The backup battery charger serves to charge the backup battery when the first means is in the OFF position. Therefore, the backup battery charger is able to charge the backup memory even if the portable transceiver fails to generate the control signal due to a poor condition of both the main and backup batteries.

One aspect of the present invention takes the form of an adaptor which is mounted on a vehicle such as to be coupled to a portable transceiver when the portable transceiver is used within the vehicle, the portable transceiver including a main battery, a backup battery and switch means, the switch means being energized by the main and backup batteries and generating a control signal when turned on for operating the portable transceiver. The adaptor comprises: first means which is coupled to a car battery which is mounted on the vehicle, the first means being switched over from OFF position to ON position for charging the main and backup batteries of the portable transceiver when the control signal is generated and being switched over from the ON position to the OFF position when the control signal is terminated; and second means coupled to the first means, the second means charging the backup battery when the first means is in the OFF position, whereby the second means is able to charge the backup memory even if the portable transceiver fails to generate the control signal due to a condition where both the main and backup batteries have discharged to an extent to be unable to induce the switch means to generate the control signal.

Another aspect of the present invention takes the form of an adaptor which is mounted on a vehicle such as to be coupled to a portable transceiver when the portable transceiver is used within the vehicle, the portable transceiver including a main battery, a backup battery and switch means, the switch means being energized by the main and backup batteries and generating a control signal when turned on for operating the portable transceiver. The adaptor comprises: first means which is coupled to a car battery which is mounted on the vehicle, the first means being switched over from OFF position to ON position when the control signal is generated and being switched over from the ON position to the OFF position when the control signal is terminated; second means coupled to the first means, the second means supplying the portable transceiver with a constant voltage when the first means is switched to the ON position; third means coupled to the first means, the third means charging the main and backup batteries when the first means is switched to the ON position; and fourth means coupled to the first means, the fourth means charging the backup battery when the first means is in the OFF position whereby the fourth means is able to charge the backup battery even if the portable transceiver fails to generate the control signal due to a condition where both the main and backup batteries have discharged to an extent to be unable to induce the switch means to generate the control signal.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

One preferred embodiment of the present invention will be discussed with reference to FIG. 2.

Figure 1:
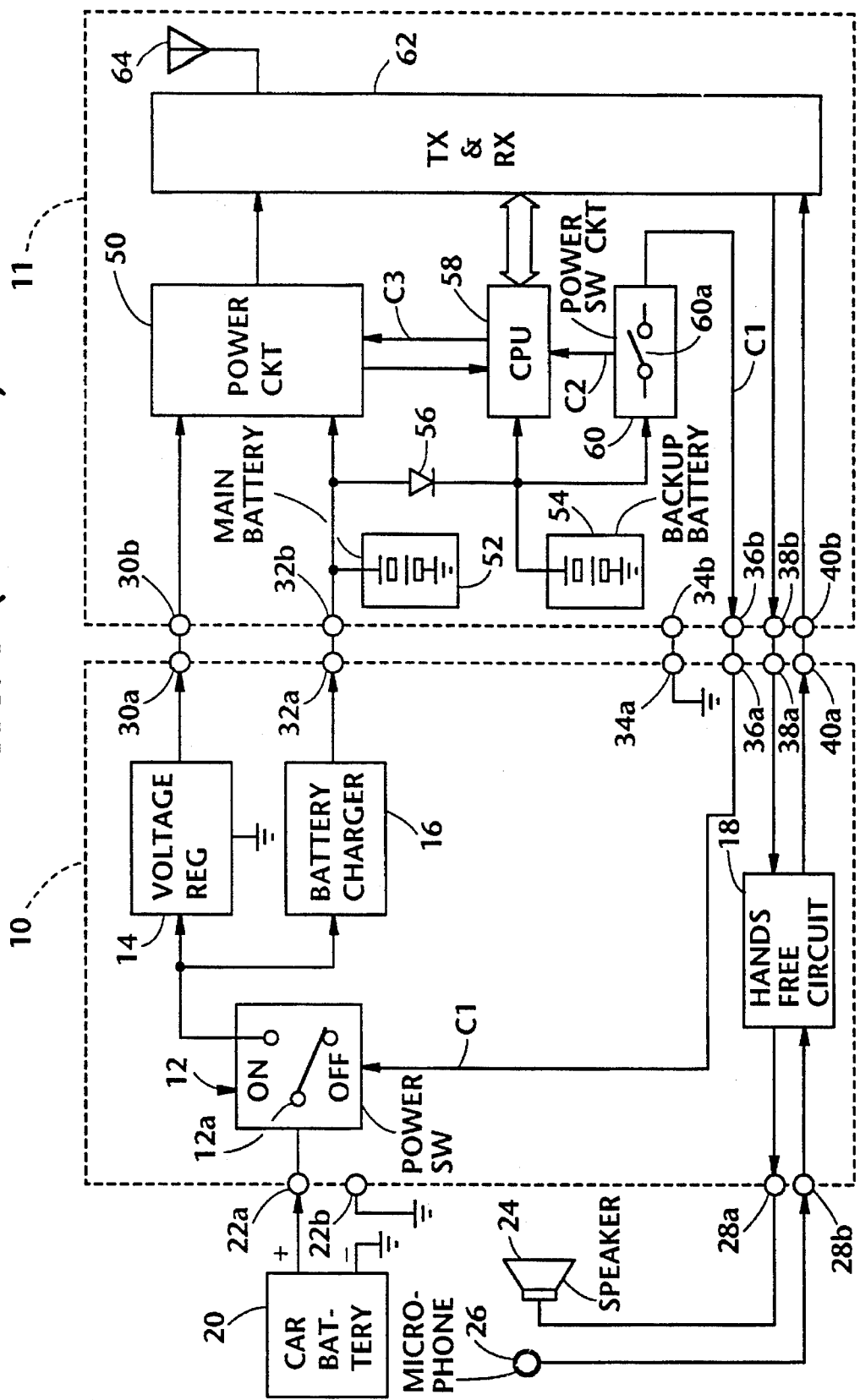
FIG. 1 is a block diagram schematically showing a known vehicle mounted adaptor to which a known portable radio transceiver is coupled, this figure having been referred to in the opening paragraphs of the instant disclosure.
Figure 2:
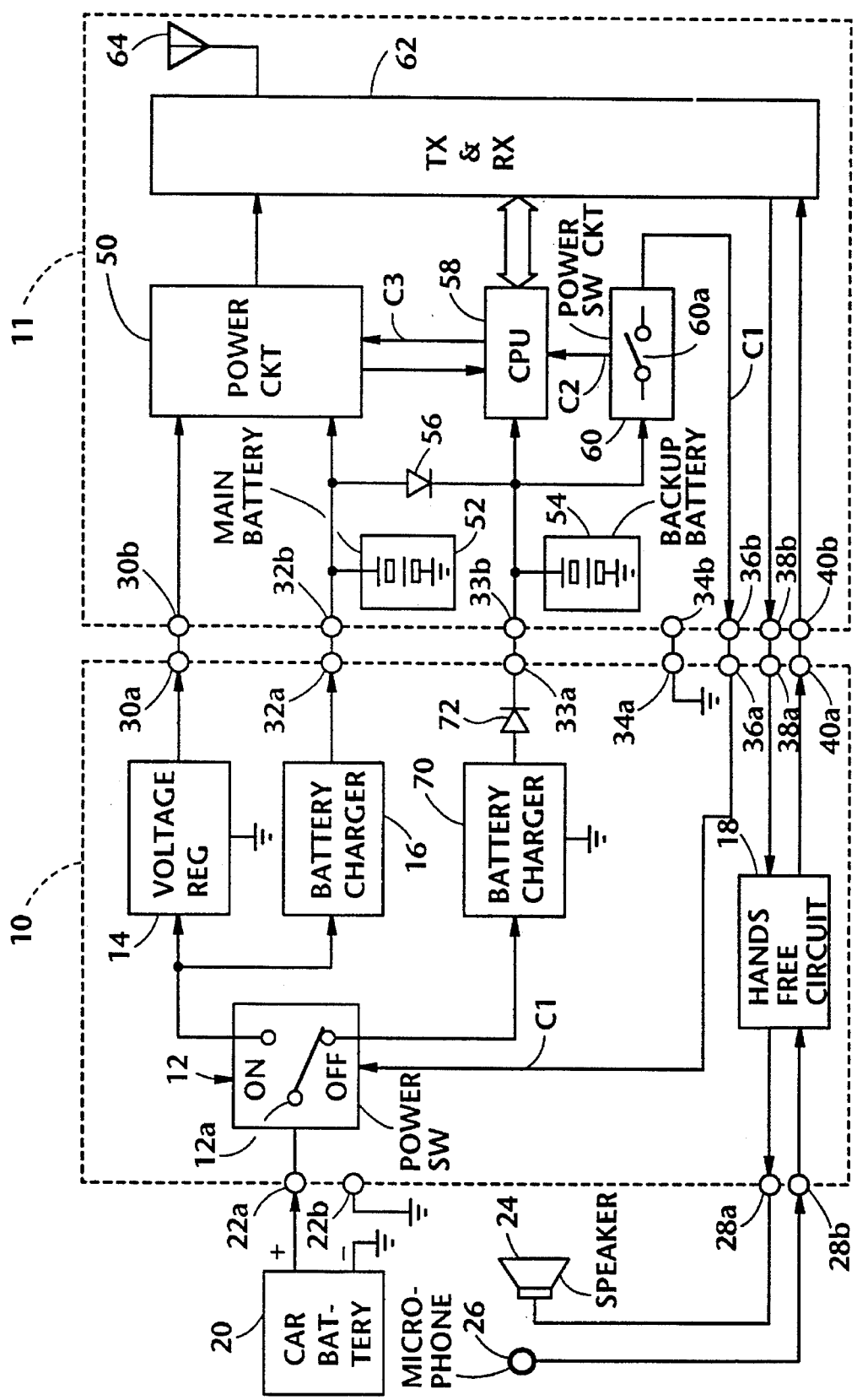
FIG. 2 is a block diagram schematically showing a vehicle mounted adaptor according to the present invention together which is coupled to a known transceiver.

The arrangement of FIG. 2 differs from that of FIG. 1 in that the former arrangement further includes a battery charger 70, a diode 72, interface terminals 33a, 33b. The remaining portions of the arrangement of FIG. 2 have been referred to in the opening paragraphs and hence will not be discussed except for the portions relevant to the present invention. The diode 72 is to prevent DC current flowing from the transceiver 11 to the battery charger 70.

As shown in FIG. 2, the battery charger 70 is coupled to the OFF terminal of the power switch 12. Thus, the battery charger 70 is able to charge, via the diode 72 and the terminals 33a, 33b, the backup battery 54 even if the power switch 12 is in the OFF position.

As mentioned above, when each of the main and backup batteries has discharged to an extent that it is unable to energize the power switch circuit 60, the control signal C1 is not generated even if a subscriber turns on the switch 60a. However, according to the present invention, if such an undesirable condition happens, the backup battery 54 is effectively charged and thus, the power switch circuit 60 is able to generate the control signal C1 when the power switch 60a is turned on. Once the power switch 12 is switched over to the ON position, the portable transceiver 11 can normally operate using DC power obtained from the car battery 20 while the main and backup batteries 52, 54 are recharged in exactly the same manner as mentioned with the prior art arrangement.

The DC current for charging the backup battery 54 is set to the order of few micro amperes (for example). Therefore, there exists no possibility which damages the car battery even if the power switch 12 remains in the OFF position without starting the engine of the vehicle on which the adaptor 10 is mounted.

In the above discussion, the antenna 64 dedicated to the portable transceiver 11 is used in the case where the transceiver 11 is used when coupled to the adaptor 10. However, a vehicle mounted antenna (not shown) can be available with the arrangement shown in the instant disclosure being slightly modified.

Further, the present invention resides in the provision of the battery charger 70 arranged between the OFF position of the power switch 12 and the backup battery 54 and thus, the instant invention is not limited to the arrangement of the transceiver 11 shown in FIGS. 1 and 2.

It will be understood that the above disclosure is representative of only one possible embodiment of the present invention and that the concept on which the invention is based is not specifically limited thereto.

What is claimed is:

1. A vehicle mounted adaptor to which a portable transceiver is mounted when said portable transceiver is used within a vehicle, said portable transceiver including a main battery, a backup battery and switch means, said switch means being energized by said main and backup batteries and generating a control signal when said transceiver is turned on, except when said main battery and backup battery are discharged below a predetermined level, said adaptor comprising:

first means for charging said main and backup batteries when said control signal is generated, wherein said first means switches from an OFF position to an ON position when said control signal is generated, said first means switches from said ON position to said OFF position when said control signal is terminated, and said first means is coupled to a car battery which is mounted on said vehicle; and second means coupled to said first means, said second means charging said backup battery when said first means is in said OFF position, whereby said second means is able to charge said backup battery even if said portable transceiver fails to generate said control signal due to a condition where both said main and backup batteries have discharged below said predetermined level.

2. An adaptor as claimed in claim 1, further comprising:

third means coupled to said first means, said third means supplying said portable transceiver with a constant voltage when said first means is switched to said ON position; and fourth means coupled to said first means, said fourth means charging said main and backup batteries when said first means is switched to said ON position.

3. An adaptor as claimed in claim 2, further comprising a diode which is provided between said fourth means and said backup battery, said diode preventing a current flow from said backup battery to said fourth means.

4. A vehicle mounted adaptor to which a portable transceiver is mounted when said portable transceiver is used within a vehicle, said portable transceiver including a main battery, a backup battery and switch means, said switch means being energized by said main and backup batteries and generating a control signal when said transceiver is turned on, except when said main battery and backup battery are discharged below a predetermined level, said adaptor comprising:

first means coupled to a car battery which is mounted on said vehicle, said first means being switched from an OFF position to an ON position when said control signal is generated and being switched over from said ON position to said OFF position when said control signal is terminated;

second means coupled to said first means, said second means supplying said portable transceiver with a constant voltage when said first means is switched to said ON position;

third means coupled to said first means, said third means charging said main and backup batteries when said first means is switched to said ON position; and fourth means coupled to said first means, said fourth means charging said backup battery when said first means is in said OFF position, whereby said fourth means is able to charge said backup battery even if said portable transceiver fails to generate said control signal due to a condition where both said main and backup batteries have discharged below said predetermined level.

5. An adaptor as claimed in claim 4, further comprising a diode which is provided between said fourth means and said backup battery, said diode preventing a current flow from said backup battery to said fourth means.

6. A vehicle mounted adaptor to which a portable transceiver is attached when said portable transceiver is used within a vehicle, said portable transceiver including a main battery, a backup battery, and a power switch, said power switch being energized by at least one of said main battery and said backup battery and generating a control signal when being turned on, said adaptor comprising:

a first interface terminal to which said main and backup batteries are coupled when said portable transceiver is attached to said adaptor;

an adaptor switch having a common terminal coupled to a car battery mounted on said vehicle, said adaptor switch, in response to said control signal, being switched to a first terminal for charging said main and backup batteries via said first interface terminal, and said adaptor switch being switched to a second terminal while said control signal is absent;

a second interface terminal to which said backup battery is coupled when said portable transceiver is attached to said adaptor; and a battery charge coupled between said second terminal and said second interface terminal, said battery charger being energized by said car battery when said adaptor switch is switched to said second terminal, whereby said backup battery is charged in the absence of said control signal.

7. A vehicle mounted adaptor as claimed in claim 6, wherein said adaptor switch is a single-pole double-throw switch.

8. A vehicle mounted adaptor as claimed in claim 6, further comprising:

a voltage regulator coupled to said adaptor switch, said voltage regulator supplying said portable transceiver with a constant voltage when said adaptor switch is switched to said first terminal; and charging means coupled to said adaptor switch, said charging means charging said main and backup batteries when said adaptor switch is switched to said first terminal.

* * * * *